R. M. CAUFFMAN.
PASTEURIZING APPARATUS.
APPLICATION FILED OCT. 19, 1910.

1,002,499.

Patented Sept. 5, 1911.

2 SHEETS—SHEET 1.

WITNESSES:
Madge Smith
Frances Rush

ROBERT M. CAUFFMAN.
INVENTOR.

By George J. Oltsch
ATTORNEY.

R. M. CAUFFMAN.
PASTEURIZING APPARATUS.
APPLICATION FILED OCT. 19, 1910.

1,002,499.

Patented Sept. 5, 1911.
2 SHEETS—SHEET 2.

WITNESSES:
Madge Smith
Frances Rush

ROBERT M. CAUFFMAN.
INVENTOR.

By George J. Oltsch
ATTORNEY.

UNITED STATES PATENT OFFICE.

ROBERT M. CAUFFMAN, OF CENTERVILLE, MICHIGAN.

PASTEURIZING APPARATUS.

1,002,499.   Specification of Letters Patent.   Patented Sept. 5, 1911.

Application filed October 19, 1910. Serial No. 587,791.

*To all whom it may concern:*

Be it known that I, ROBERT M. CAUFFMAN, a citizen of the United States, residing at Centerville, in the county of St. Joseph and State of Michigan, have invented certain new and useful Improvements in Pasteurizing Apparatus, of which the following is a specification.

My invention relates to improvements in apparatus for pasteurizing milk, and has for its object the improvement of the construction and efficiency of devices of this character.

Another object of the invention resides in the provision of improved means for controlling and regulating the induction of the heating medium into the pasteurizing chamber, in order to obtain a more uniform distribution thereof throughout the chamber, and subject the bottled milk stored therein to practically the same temperature at one and the same time.

Another object of the invention resides in the provision of means for cooling the milk by the admission of water into the pasteurizing chamber, and partially submerging the milk bottles, and so regulating the admission of water as to raise its temperature by the heat of the walls of the chamber as it first flows thereinto, and before coming in contact with the highly heated bottles, and gradually reducing the temperature by continuing the flow of water into and out of the chamber.

With these and other objects in view, the invention consists of certain novel features of construction, as hereinafter shown and described, and specifically pointed out in the claims.

Figure 1:
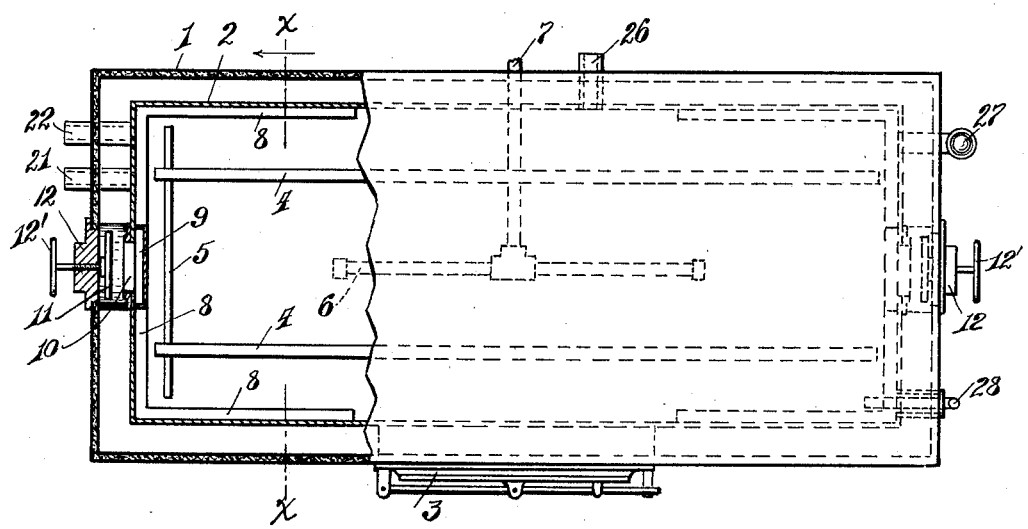
Figure 2:
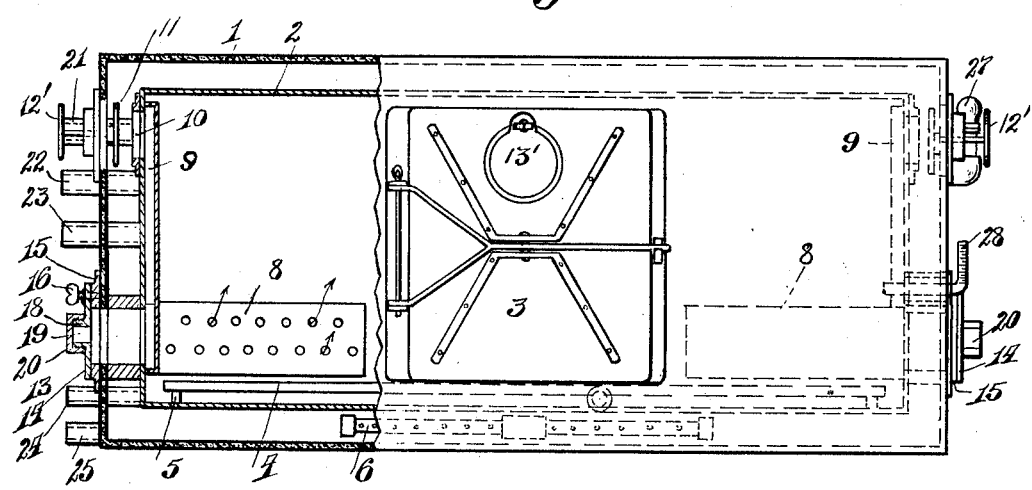
Figure 3:
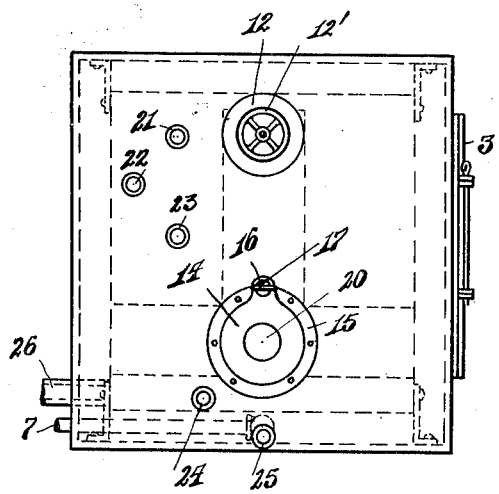
Figure 4:
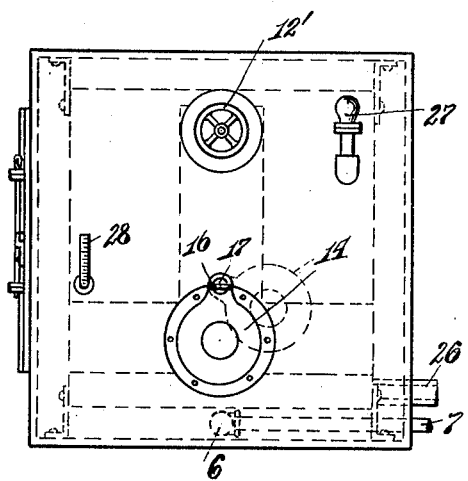
Figure 5:
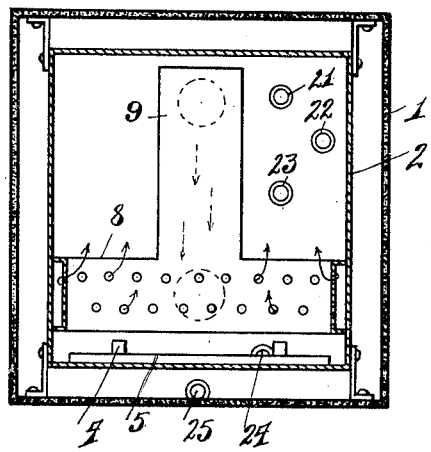

In the drawings employed for illustrating the preferred embodiment of the invention—Figure 1 is a plan view of the improved apparatus, partly in section. Fig. 2 is a front side elevation, partly in section. Fig. 3 is an end elevation of one end of the apparatus. Fig. 4 is an end eelvation of the opposite end thereof. Fig. 5 is a transverse section on the line *x—x* of Fig. 1.

The apparatus comprises an outer casing 1, the walls of which are preferably of two thicknesses of sheet metal, with a non-conducting material, as asbestos, between the walls. An inner casing 2 of sheet metal, is disposed within the outer casing, and spaced therefrom on all sides, except at that portion adjoining the door 3, through which access is had to the inner casing, the intervening space between the outer and inner casings being walled up around the door opening and corresponding opening in the inner casing. The door 3 is preferably hinged, as shown, and provided with a suitable latch device, and of a sufficient size to permit trays containing the bottled milk to be handily inserted into and removed from the inner casing or pasteurizing chamber. Bars 4 are disposed longitudinally of the inner chamber and upon cross-bars 5 resting upon the bottom of said chamber, to serve as a rest or support for the trays containing the bottled milk, and hold the same elevated so that the heating as well as the cooling medium may pass around all sides of the trays.

Live steam is preferably used as a heating medium, and is supplied to the space between the outer and inner casing by a pipe 6, disposed between the bottom of the inner and outer casing, said pipe being perforated to permit the discharge and proper diffusion of the steam, and having a branch 7 extending through the outer casing, with which connection may be made with any suitable source of steam supply. Mounted within the inner casing and at each end thereof, are perforated ducts 8, which extend across the ends and along the sides of the casing, as shown. A branch 9 extends upwardly from each duct, and a valve opening 10 communicates with the upper end of each branch, so that when steam is admitted to the space between the outer and inner casing, it will enter through said valved openings into the ducts and out into the inner casing through the perforations, the discharge of the steam into the inner casing being thus widely distributed and subjecting all of the bottled milk stored therein to practically the same temperature at one and the same time, thus making for uniformity of treatment and obviating the necessity of over-treating a part of the milk in order to subject the remainder to the proper treatment to effect pasteurization. The steam thus freely circulates around the exterior and within the inner casing, thus subjecting the bottled milk to the direct action of the steam, the envelop of steam around the exterior heating the space between the casings and thereby indirectly imparting heat to the inner casing, as well as preventing the rapid radiation of the heat contained within the inner casing. After a sufficient quantity of steam has been admitted to the apparatus as may be necessary to bring the milk up to the proper temperature for pasteurization, the openings 10 are closed by means of the disk-valves 11, the stems of which are screw-threaded for engagement with screw-threaded apertures in the head members 12, which latter are in turn in screw-threaded engagement with openings in the outer casing, so that the valves may be easily and quickly removed for cleansing or repair. The valve stems are provided with hand-wheels 12′ for manipulating the same.

In order to control the temperature of the inner casing, so as to prevent breakage of bottles by a too sudden raising of, or by maintaining too high a temperature, air ducts 13 are provided which afford direct communication with the perforated ducts 8 near the bottom of the casing, through which cold air may be admitted to mix with the steam within the inner casing. The closures for the air ducts consist each of a disk 14, which has a smooth inner surface for contact with the flanges 15, and is clamped thereto by a thumb-screw 16, the shank of which passes through the disk near the upper edge thereof and is screw-threaded for engagement with a similarly threaded tap in the flange rim. The thumb-screw is provided with a head 17, so that upon tightening the screw the head will bear against and force the disk into tight contact with the flange. The door 3 is also provided with an inlet opening and a disk closure 13′ of the same type as above described. The thumb-screws also serve as a pivot for the disk closures, whereby any or all of the disks may be swung sidewise on their pivots so as to obtain the desired size of opening to permit the proper quantity of air to enter, the same being held in any adjusted position by simply tightening the thumb-screws. The disk closures at the ends of the apparatus are provided with coupling members 18, with an opening 19 therethrough, and a screw-cap 20 for closing the opening while steam is being admitted to the apparatus.

In order to effect a rapid cooling of the milk as well as the trays in which the bottles are placed, so as to permit same to be readily handled, and for their removal from the apparatus, water is injected into the inner casing by removing the screw-cap 20, and coupling a hose leading from a water supply to the coupling member 18. The hose may be attached at either end of the apparatus, whichever may be the most convenient, and the same results attained. In order to prevent breakage of the heated bottles, which would result by the cold water suddenly coming in contact therewith, the water is turned on gradually, so that the initial flow will have time to be warmed by the heat of the ducts and walls of the inner casing before rising to a height sufficient to contact with the bottom of the bottles, for which purpose the trays containing the bottles are elevated from the bottom of the casing, which would first fill with water before coming in contact with the bottles. As the water continues to flow into the casing the temperature of the water is gradually reduced, having absorbed all the heat of the ducts and casing walls, and the cooling of the milk effected without danger of fracturing the bottles. In order to prevent the water from rising above the upper ends of the bottles and mixing with the milk, where the same are not previously corked, or where ordinary paper disk stoppers, which are not always water tight, are used, overflow pipes 21, 22 and 23 are provided, which are located at different heights corresponding to the height of the bottles used, as half-pint, pint and quart bottles. The overflow pipes as well as the drain pipes 24, 25 and 26, are provided with suitable valves, (not shown) so as to permit same to be opened or closed, as occasion may require, during the admission of steam or water, or for draining the inner or outer casings.

The apparatus is provided with a suitable safety-valve 27, which has connection with the inner casing, so as to prevent excess steam pressure therein. A thermometer 28, readable from the exterior of the apparatus, is arranged within a tubular connection extending through the outer into the inner casing. The operator may thus readily ascertain the temperature within the inner casing, and manipulate the valves and closures controlling the admission of steam, air and water, so as to obtain the required temperature necessary for the pasteurization of the milk, and for the cooling of the same.

Having thus described my invention, what is claimed is—

1. In an apparatus of the class described, an outer and inner casing spaced apart, means for supplying a heating medium to the space between the casings, means having communication with said space for conducting and distributing the heating medium at divers points within the inner casing, a valve controlling said point of communication and operable from without the outer casing, an air duct leading from without the outer casing into direct communication with the means for distributing the heating medium within the inner casing, and an adjustable closure for the duct.

2. In an apparatus of the class described, an outer and inner casing spaced apart, means for supplying a heating medium to the space between the casings, perforated ducts having communication with said space and arranged within and along the end and side walls of the inner casing, inlet openings extending from without the outer casing into said ducts, a closure for said openings comprising a disk, a combined pivot and clamping screw extending through said disk near the edge thereof, a coupling member formed integral with the disk having a bore extending through the disk, and a removable cap for the disk.

In testimony whereof I affix my signature, in presence of two witnesses.

ROBERT M. CAUFFMAN.

Witnesses:
 THOMAS W. MORRISON,
 ETHEL CROTHERS.

---

Copies of this patent may be obtained for five cents each, by addressing the "Commissioner of Patents, Washington, D. C."